United States Patent [19]

Luedeke et al.

[11] Patent Number: 5,140,775
[45] Date of Patent: Aug. 25, 1992

[54] BELT GRINDING ASSEMBLY

[75] Inventors: Arthur P. Luedeke, St. Paul; Bradley W. Keller, Forest Lake; Clarence I. STeinback, Roseville, all of Minn.

[73] Assignee: Minnesota Mining and Manufacturing Company, St. Paul, Minn.

[21] Appl. No.: 359,729

[22] Filed: May 31, 1989

[51] Int. Cl.$^5$ .............................................. B24B 21/00
[52] U.S. Cl. .............................. 51/145 T; 51/237 T; 51/328; 51/135 R
[58] Field of Search ................ 51/145 T, 134, 237 T, 51/53, 108 R, 118, 145 R, 137, 135 R, 328; 29/33 R, 33 J, 33 S, 33 Q, 33 P, 33 T, 563, 564, 35.5, 38 R, 37 R

[56] References Cited

U.S. PATENT DOCUMENTS

| | | | |
|---|---|---|---|
| 1,537,697 | 5/1925 | Roberts | 51/134 |
| 1,817,554 | 8/1931 | Griswold . | |
| 2,110,931 | 3/1938 | Dyer et al. | 51/103 |
| 2,406,728 | 8/1946 | Wharton | 51/145 T |
| 2,484,583 | 10/1949 | Paulson | 51/134 |
| 2,546,504 | 3/1951 | Head | 51/217 |
| 2,554,079 | 5/1951 | Wilson | 51/76 |
| 2,695,479 | 11/1954 | Indge | 51/134 |
| 2,814,919 | 12/1957 | Jones et al. | 51/215 |
| 2,990,659 | 7/1961 | Benkovich et al. | 51/118 |
| 3,322,434 | 5/1967 | McClung et al. | 279/123 |
| 3,526,062 | 9/1970 | Sommer | 51/108 |
| 3,864,816 | 2/1975 | Brusch | 29/563 |
| 4,272,088 | 6/1981 | Perry | 279/114 |
| 4,339,988 | 8/1983 | De Shong . | |
| 4,833,831 | 5/1989 | Armstrong, Jr. . | |

FOREIGN PATENT DOCUMENTS 1945499  9/1966  Fed. Rep. of Germany .

Primary Examiner—M. Rachuba
Attorney, Agent, or Firm—Gary L. Griswold; Walter N. Kirn; Jeffrey J. Hohenshell

[57] ABSTRACT

A belt grinding assembly for grinding a smoothly radiused edge surface on an elongate bar such as a wrench. A bar manipulating mechanism moves the edge surface of the bar at a uniform rate of speed along an arcuate path about an axis at a right angle to a first direction in which an abrasive belt is driven into forceful engagement with the abrasive belt as it is driven along a support surface. The bar manipulating mechanism includes a wheel rotated at a uniform speed about an axis at a right angle to the first direction to sequentially move the periphery of the wheel past a loading station and then past the support surface; a clamp including jaws mounted on the wheel for relative movement between a release position with the jaws spaced to freely receive a bar, and an engage position adapted to firmly clamp the bar between the jaws; and jaw actuating structure that moves the jaws from a release position at the loading station, and positions the jaws in the engage position during movement of the clamp assembly past the support surface.

14 Claims, 4 Drawing Sheets

BELT GRINDING ASSEMBLY

TECHNICAL FIELD

The present invention relates to belt grinding assemblies adapted for use to grind a smooth arc on an edge surface extending between major side surfaces on an elongate bar such as a wrench, which edge surface has a predetermined shape that may not be linear along the length of the bar or wrench.

BACKGROUND ART

Belt grinding assemblies are known that are adapted for use to grind a smooth arc on an edge surface extending between major side surfaces on an object or elongate bar such as a wrench, which edge surface has a predetermined shape when viewed in the planes of the major surfaces that may or may not be linear along the length of the wrench. Such grinding assemblies are useful to change an original rough or irregular edge surface resulting from the method by which the wrench was formed (e.g., drop forging) into a smoothly arced edge surface that is more aesthetically pleasing and easier on the hand of user of the wrench than the original rough or irregular edge surface. One such grinding assembly comprises the combination of (1) a belt grinding assembly including a drive mechanism for driving an abrasive belt in a first direction along a path past a backup platen fixed to frame means for the assembly, which platen has a support surface for the abrasive belt adjacent its rear surface that is straight in direction of travel of the belt and has a uniform shape corresponding to the shape of the edge surface to be radiused in a direction at a right angle to the direction of travel of the belt; and (2) bar manipulating means for moving the edge surface of the bar along an arcuate path about an axis at a right angle to the direction of travel of the belt into forceful engagement with the abrasive coated surface of the belt along the support surface to form the radius on the bar. In this known belt grinding assembly the bar manipulating means is provided by a conveyer including a conveyer belt formed by two parallel spaced endless lengths of roller chain, metal slats extending transversely between opposite chain links, and receptacles for the bars attached to the slats on the sides of the slats opposite the lengths of chain; and a drive mechanism for the belt including two parallel spaced axles each carrying two axially spaced sprockets around which the chains were tensioned. Each of the receptacles is adapted to receive one of the bars therein with the length of the bar extending parallel to the slats and an edge surface of the bar projecting away from the slats, and the sprockets at one end of the conveyer are positioned so that movement of one of the receptacles around the sprockets on one of the axles will move a bar in the receptacle in an arc into forceful engagement with the abrasive belt along the support surface to grind a radius on the edge surface of the bar.

Another such grinding assembly comprises the combination of (1) a belt grinding assembly including a drive mechanism for driving an abrasive belt in a first direction along a path past a grinding station; and (2) bar manipulating means for moving the edge surface of the bar along an arcuate path about an axis at a right angle to the direction of travel of the belt into forceful engagement with the abrasive coated surface of the belt at the grinding station to form the radius on the bar; the bar manipulating means being provided by a drum having receptacles for the bars attached to its periphery; and a chain drive mechanism for the drum. Each of the receptacles is adapted to receive one of the bars therein with the length of the bar extending parallel to the axis of the drum and an edge surface of the bar projecting away from the slats, and the drum is positioned so that movement of one of the receptacles around its periphery will move a bar in the receptacle in an arc into forceful engagement with the abrasive belt along the support surface to grind a radius on the edge surface of the bar.

While such a grinding assemblies can grind a radius on the side surface of a bar or wrench, they present several problems. Looseness of the bar in the holder, between the conveyer belt and the sprockets, or in the chain drive allows the bar to momentarily not be moved by the drive mechanism as the bar is initially brought into engagement with the abrasive belt along the support surface, after which the drive mechanism does move the bar into forceful engagement with the abrasive belt until the bar is positioned along the support surface so that the force of such engagement is directed to move the bar with the belt, whereupon such looseness allows the bar to move with the belt, resulting in movement of the bar too quickly out of engagement with the abrasive belt along the support surface. The result of such engagement between the bar and the belt is to produce a ground edge surface on the bar that is not uniform in that too much metal is removed from the portion of the bar that initially engages the belt, and too little metal is removed from the portion of the bar that is in final engagement with the belt. Also, the bar or wrench can fall free of the holders as it moves out of engagement with the belt, which can be dangerous.

DISCLOSURE OF INVENTION

The present invention provides a belt grinding assembly that can grind a uniformly arced edge surface extending between major side surfaces on an elongate bar such as a wrench, which edge surface has a predetermined shape that may or may not be linear along the length of the bar or wrench.

The belt grinding assembly according to the present invention includes (1) a belt grinding mechanism comprising a continuous abrasive belt, means for driving the abrasive belt in a first direction along a path relative to a frame; a backup platen fixed to the frame and having a support surface along the path and adjacent the rear surface of the belt, which support surface is straight in the first direction and has a uniform shape corresponding to the shape of the edge surface in a direction at a right angle to the first direction; and (2) bar manipulating means for moving the edge surface of the bar at a uniform rate of speed along an arcuate path about an axis at a right angle to the first direction into forceful engagement with the abrasive belt along the support surface. The bar manipulating means comprises a wheel; means mounting the wheel on the frame for rotation about an axis at a right angle to the first direction to sequentially move a periphery of the wheel past a loading station relative to the frame, and then past the support surface; drive means for rotating the periphery of the wheel past the support surface at a uniform rate of rotation; clamp means comprising spaced jaws mounted on the periphery of the wheel for relative movement between a release position with the jaws spaced to freely receive a bar between the jaws, and an engage position adapted to firmly clamp the bar between the jaws; and jaw actuating means for moving the jaws from a release position at the loading station, and for positioning the jaws in the engage position as the clamp assembly moves past the support surface.

Preferably, movement of the edge surface of the bar along the arcuate path into forceful engagement with the abrasive belt at a uniform rate of speed is facilitated by the drive means comprising a helical gear coaxial with the wheel and having a diameter dimension of within 25 centimeters (10 inches) of the diameter dimension of the wheel, a driving worm gear having an axis at a right angle to the axis of the helical gear engaged with the helical gear, means for mounting the worm gear for radial movement relative to the helical gear, and means for biasing the teeth of the worm gear into engagement with the teeth of the helical gear to restrict backlash between the gears.

Also, preferably the jaws include a first jaw releasably attached to the periphery of the wheel in a fixed position and a second jaw mounted on the wheel for pivotal movement relative to the first jaw between the release and the engage positions; the jaw actuating means comprises a spring between the wheel and the second jaw for firmly biasing the second jaw toward the engage position, and cam means including a cam follower mounted on the second jaw and a cam mounted on the frame for moving the second jaw to the release position; and the clamp means comprises a plurality of pairs of spaced jaws mounted on the periphery of the wheel in spaced relationship, each of the pairs being mounted on the wheel for relative movement between the release and engage position, the jaw actuating means moves each of the pairs of jaws to the release position at the loading station, positions the jaws in the engage position as the clamp assembly moves past the support surface, and moves each of the pairs of jaws to the release position at a subsequent unloading position relative to the frame along the lowermost portion of the wheel so that the finished bar or wrench can be dropped into a container.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
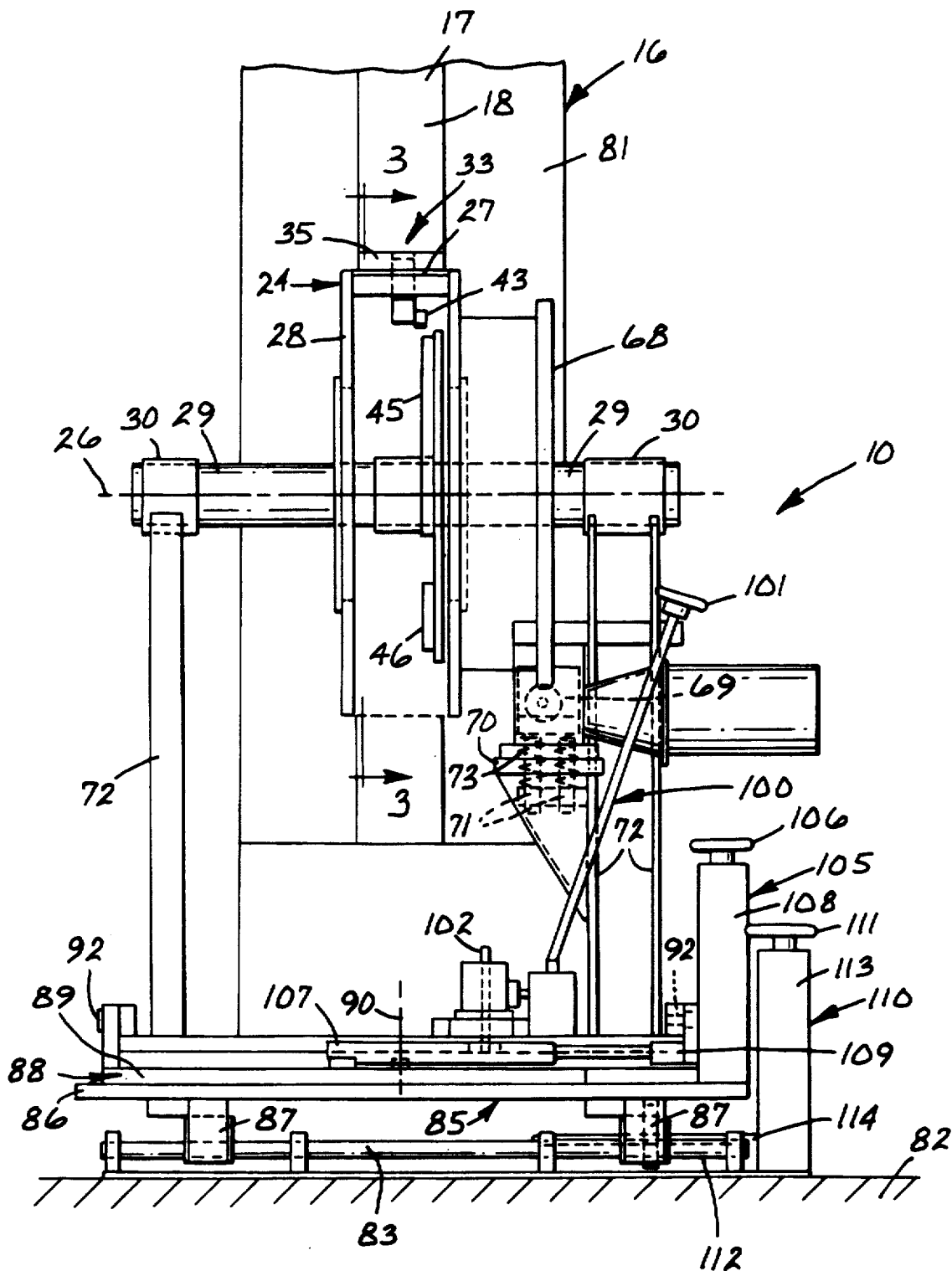
FIG. 1 is a fragmentary front vertical view of a belt grinding assembly according to the present invention, which view has parts broken away to show details.

Referring now to the drawing, there is shown a belt grinding assembly 10 adapted for use on an elongate bar such as a wrench 12 illustrated having opposite major side surfaces and an initial edge surface 14 between the side surfaces that is rough and has a predetermined shape when viewed in the planes of the major surfaces that may not be linear along the length of the wrench 12. The grinding assembly 10 is adapted to grind the wrench 12 to form a new edge surface extending between the side surfaces that is smoothly arched while retaining the predetermined shape along the length of the wrench 12.

Figure 2:
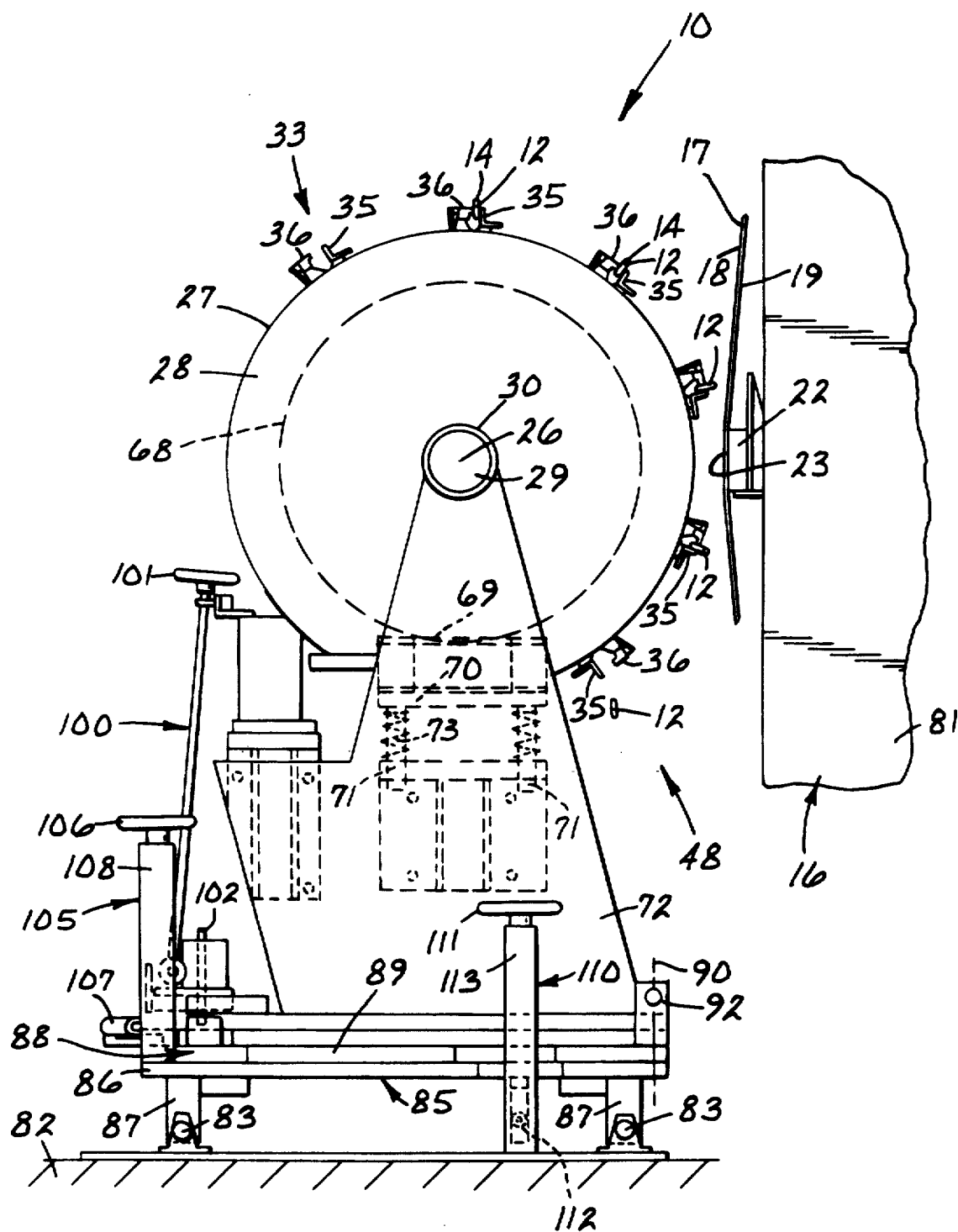
FIG. 2 is a fragmentary side vertical view of a belt grinding to the present invention.

Generally the belt grinding assembly 10 comprises a belt driving mechanism 16 comprising a conventional continuous abrasive belt 17 having a flexible cloth backing with front and rear surfaces 18 and 19, and abrasive granules attached along its front surface 18 (e.g., the abrasive belt sold by Minnesota Mining and Manufacturing Company, St. Paul, MN, under the trade designation 3M 331D "Three-M-ite" T.M. Resin Bond Cloth Belts), means for driving the abrasive belt 17 in a first direction along a path relative to frame means for the assembly 10 in the form of a convention belt drive mechanism (not shown) including spaced rollers around which the abrasive belt 17 is tensioned and a motor drive assembly that drives the rollers and thereby the abrasive belt 17 (e.g. the vertical slack belt machines sold by KLK Industries, Crystal, MN, or G & P Industries, Indianapolis, IN); a backup platen 22 fixed to the frame means and having a support surface 23 along the path adjacent the rear surface 19 of the abrasive belt 17, which support surface 23 is straight in the first direction in which the abrasive belt 17 is driven (see FIGS. 2 and 3) and has a uniform shape corresponding to the shape of the edge surface 14 in a direction at a right angle to the first direction in which the abrasive belt 17 is driven (see FIG. 4); and bar manipulating means for moving the edge surface 14 of the wrench 12 at a uniform rate of speed along an arcuate path about an axis 26 at a right angle to the first direction in which the abrasive belt 17 is driven into forceful engagement with the abrasive belt 17 along the support surface 23.

The bar manipulating means or mechanism comprises a wheel 28 having an axis 26, a generally cylindrical periphery 27; means in the form of an axle 29 for the wheel 28 journaled in bearings 30 on the frame means mounting the wheel 28 on the frame means for rotation about the axis 26 at a right angle to the first direction in which the abrasive belt 17 is driven to sequentially move the periphery 27 of the wheel 28 past a loading station 33 relative to the frame means, and then past the support surface 23 of the platen 22; drive means for rotating the periphery 27 of the wheel 28 past the support surface 23 of the platen 22 at a uniform rate of rotation; clamp means comprising pairs of first and second spaced jaws 35 and 36 mounted on the wheel 28 in spaced relationship about its periphery 27 for relative movement between a release position (see the jaws 35 and 36 at the loading station 33) with the jaws 35 and 36 spaced to freely receive a wrench 12 between the jaws 35 and 36, and an engage position (see the jaws adjacent the platen 22) adapted to firmly clamp the wrench 12 between the jaws 35 and 36; and jaw actuating means (later to be explained) for positioning the jaws 35 and 36 in their release position at the loading station 33, and for positioning the jaws 35 and 36 in their engage position as each clamp assembly moves past the support surface 23 of the platen 22.

For each pair of jaws 35 and 36 the first or fixed jaw 35 is releasably attached to the periphery 27 of the wheel 28 in a fixed position by means later to be explained, and the second or movable jaw 36 is mounted on the wheel 28 by means including a pivot pin 40 for pivotal movement relative to the wheel 28 and fixed jaw 35 between the release and the engage positions; and the jaw actuating means includes a spring 42 between the fixed jaw 35 and the movable jaw 36 for biasing the movable jaw 36 toward the engage position of the jaws 35 and 36, and cam means including a cylindrical cam follower 43 mounted on the movable jaw 36 for rotation about an axis parallel to the axis 26 of the wheel 28, and first and second cams 45 and 46 mounted on the frame means, which cams 45 and 46 have cam surfaces positioned for engagement by the cam followers 43 to position the movable jaws 36 in the release positions of the jaws 35 and 36 when the pairs of jaws 35 and 36 are at the loading station 33 preceding the platen 22 or at an unloading station 48 subsequent to the platen 22 and fixed relative to the frame means along the lowermost portion of the wheel 28, and past which unloading station 48 the pairs of jaws 35 and 36 are moved after movement from the loading station 33 past the support surface 23 of the platen 22 so that the finished wrench 12 can be dropped into a receptacle at the unloading station 48.

Figure 3:
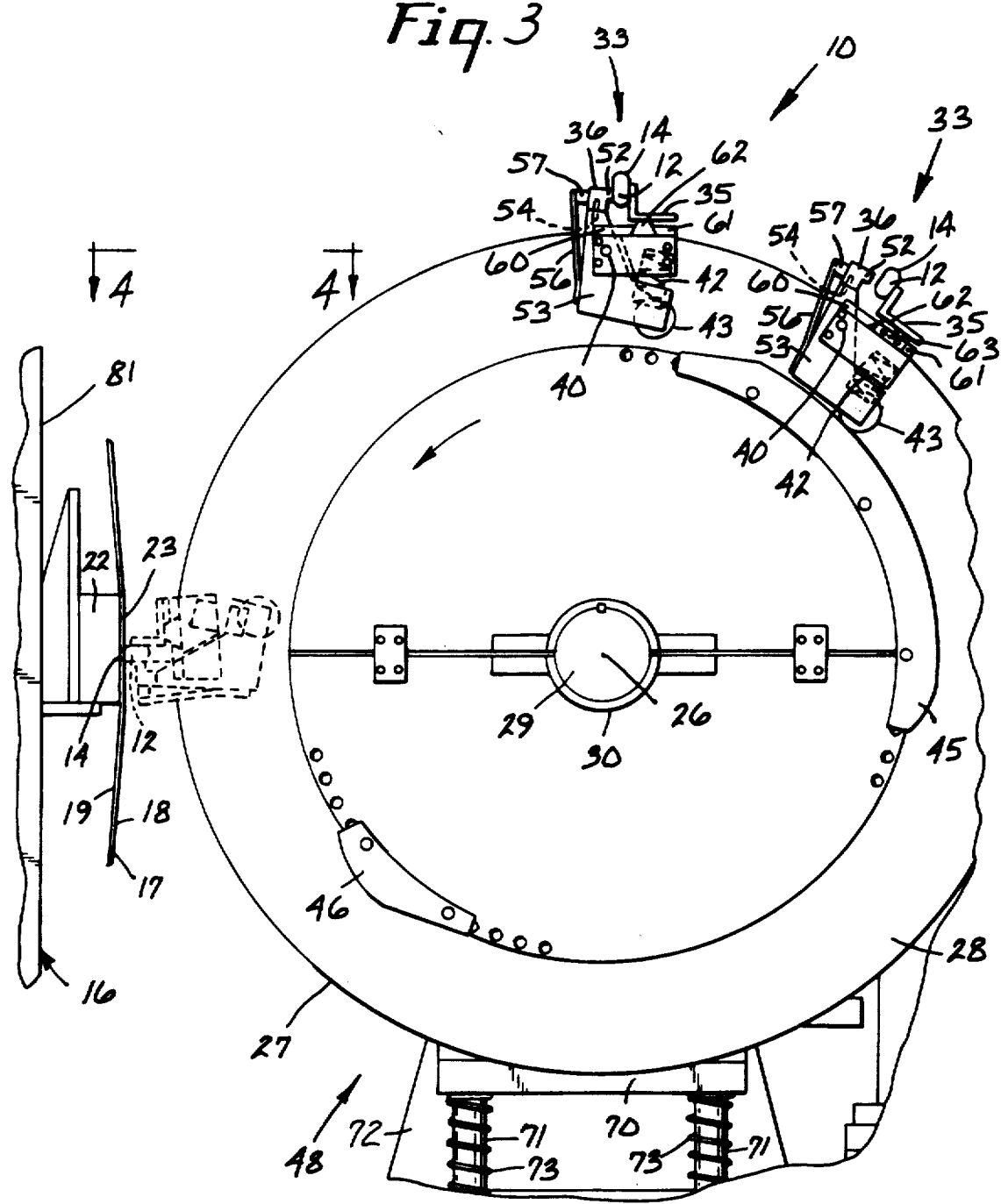
FIG. 3 is an enlarged fragmentary side vertical view of a belt grinding assembly according to the present invention, which view has parts broken away to show details.
Figure 4:
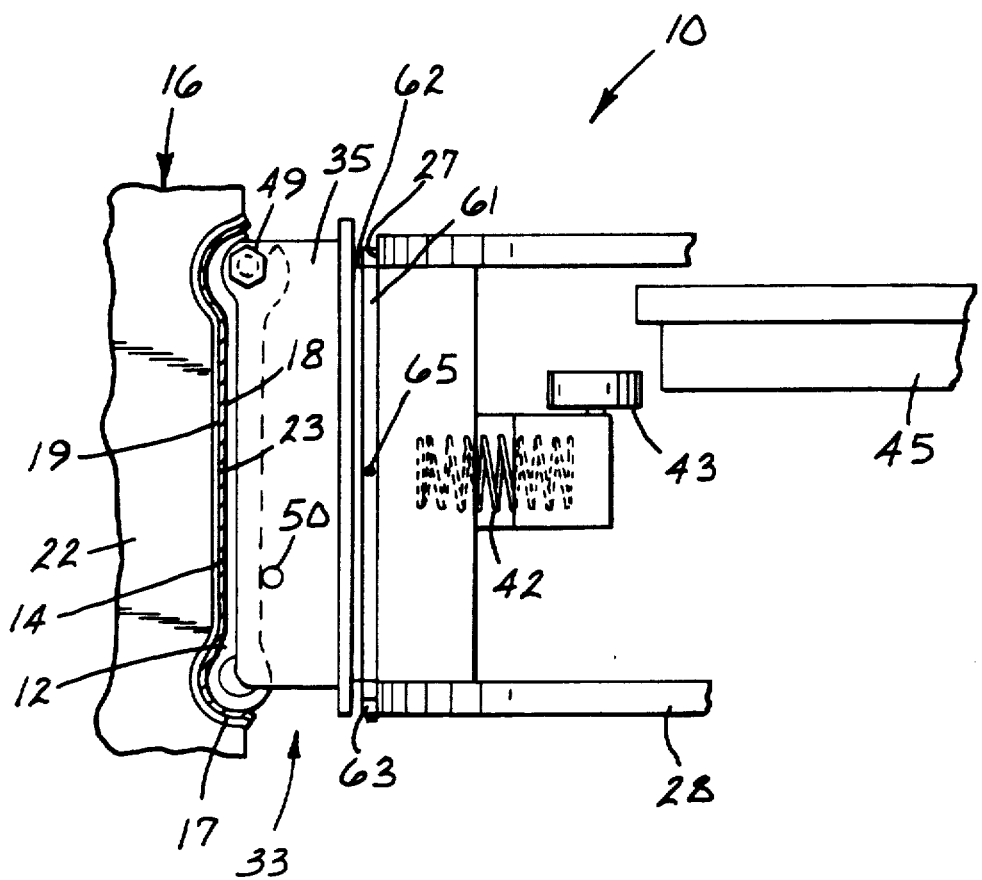
FIG. 4 is an enlarged fragmentary sectional view taken approximately along lines 4—4 of FIG. 3.

As can best be seen in FIG. 4, each pair of jaws 35 and 36 is shaped to position the wrench 12 at a predetermined position there between, such as through the use of a pin 49 received between jaws of the wrench 12 and a pin 50 for supporting the edge surface of the wrench 12 opposite the edge surface 14 being radiused by the grinding assembly 10. Different shaped jaws 35 and 36 may thus be required for different shaped wrenches, and the use of such different shaped jaws is facilitated by the means for releasably attaching the fixed jaw 35 described below, and means for changing a minor contact portion 52 of the movable jaw 36 that is shaped to engage a particular wrench or other bar. That means for changing the contact portion 52 of the movable jaw 36, best seen in FIG. 3, comprises the movable jaw 36 having a major portion 53 pivotably mounted on the pivot pin 40 and on which major portion 53 the cam follower 43 is mounted, which major portion 53 has a pivotable support pin 54 projecting generally centrally and radially of the wheel 28, on which pivotable support pin 54 the minor contact portion 52 of the movable jaw 36 is pivotably mounted. Pivotal movement of the minor contact portion 52 of the movable jaw 36 around the pin 54 insures complete contact of the movable jaw 36 with the wrench 12 between the jaws 35 and 36. The minor contact portion 52 of the movable jaw 36 is retained in place on the pin 54 and against the major portion 53 by a leaf spring 56 having an end portion fixed on the major portion 53 of the movable jaw 36, and carrying a lug 57 on its distal end adapted to engage over a lip on the minor contact portion 52 of the movable jaw 36. When desired, the contact portion 52 can be easily replaced by a contact portion of a different shape by pulling the lug 57 out of the recess in the contact portion 52 of the movable jaw 36 against the bias of the spring 56, lifting the contact portion 52 off of the pin 54, positioning the new contact portion on the pin 54, and allowing the lug 57 to enter the recess in the new contact portion under the influence of the spring 56 to retain it in place.

The means for releasably attaching the first or fixed jaw 35 of each pair of jaws to the periphery 27 of the wheel 28 comprises structural means in the form of spaced metal bars 60 and 61 attached transversely along the periphery 27 of the wheel 28 and adapted, together with a cylindrical outer portion of the wheel 28, to define a slot extending generally parallel to the axis 26 of the wheel 28 and having an inlet opening at the end of the slot viewed in FIG. 3. The fixed jaw 35 has a base 62 adapted for close fitting engagement in the slot, and means including a lever 63 pivotable to a position projecting across the open end of the slot from a position spaced from the open end of the slot is provided for releasably retaining the base 62 of the fixed jaw 35 in the slot. The side surfaces of at least one and preferably both of the bars 60 and 61 defining the side surfaces of the slot are disposed at an acute angle relative to the outer surface of the cylindrical portion of the wheel 28. The means for releasably retaining the base 62 in the slot further includes means for forcefully pressing the base 62 against one or both of those side surfaces of the bars 60 and 61, which as illustrated could be a set screw 65 transversely through the bar 61, or alternately (not shown) could include mounting the bar 61 for limited sliding movement in a direction transverse to the slot, spring biasing the bar 61 toward the bar 60, and providing slots in the bar 61 and wheel 28 which would receive the end of a screwdriver by which the bar 61 could be moved away from the bar 60 against the biasing of such springs to permit insertion and removal of the base 62.

The backup platen 22, which has a uniform shape corresponding to the shape of the edge surface 14 in a direction at a right angle to the first direction in which the abrasive belt 17 is driven, must also be changed for different shaped wrenches or bars, and thus is removably attached to the frame means by bolts (not shown). The support surface 23 of the platen 22 along the path adjacent the rear surface of the abrasive belt 17 is covered with an about ⅛ inch thick layer of the graphite covered backing sold by Process Engineering Corporation, Crystal Lake, IL, which facilitates sliding movement of the backing of the abrasive belt 17 along the fixed support surface 23 when the wrench 12 is pressed into forceful grinding engagement with the abrasive belt 17 moving over it.

The wheel 28 has a predetermined diametrical dimension (e.g., 76 centimeters or 30 inches) at its periphery 27, and the drive means for rotating the periphery 27 of the wheel 28 past the support surface 23 of the platen 22 at a uniform rate of rotation comprises a helical gear 68 coaxial with and fixed to the wheel 28 (which helical gear 68 has diametrical dimension of about 61 centimeters or 24 inches, which is, as is preferred, within 25 centimeters or 10 inches of the diametrical dimension of the wheel 28), a worm gear 69 having an axis at a right angle to the axis 26 of the helical gear 68 and wheel 28, which worm gear 69 is engaged with the helical gear 68 and is driven by a variable speed motor (not shown), means for mounting the worm gear 69 for radial movement relative to the helical gear 68, and means for biasing the teeth of the worm gear 69 into close fitting engagement with the teeth of the helical gear 68 to restrict backlash between the gears 68 and 69. The means for mounting the worm gear 69 for radial movement relative to the helical gear 68 and the means for biasing the teeth of the worm gear 69 into engagement with the teeth of the helical gear includes a portion 70 of the frame means on which the worm gear 69 is rotatably mounted, which frame means portion 70 includes a plurality of parallel pins 71 projecting at a right angle to the axis of the worm gear 69 and received for longitudinal sliding movement in sockets in a portion 72 of the frame means on which the wheel 28 is mounted, and coil springs 73 around the pins 71 between the frame portion 72 on which the wheel 28 is mounted and the frame portion 70 on which the worm gear 69 is mounted.

Means in the form of relatively movable portions of the frame means and adjustable mechanisms between those portions are also provided for providing precise alignment between the wrench 12 in the jaws 35 and 36 and the support surface 23 so that the wrench 12 will be brought into the desired engagement with the abrasive belt 17 along the support surface 23 to form the desired radius on the edge surface 14. The relatively movable portions of the frame means include (1) a fixed portion comprising a frame 81 of the belt driving mechanism 16, a floor 82 on which the frame 82 is mounted in a fixed position, and two parallel rail assemblies 83 supported in a fixed position on the floor 81; (2) a transversely movable portion 85 comprising a transversely movable plate 86 and four linear bearing assemblies 87 projecting from a bottom surface of the plate 86, which linear bearing assemblies 87 are mounted around the rail assemblies 83 for linear movement there along; a horizontally pivotable portion 88 comprising a horizontal pivot plate 89 laying in face to face contact with the upper surface of the transversely movable plate 86 and mounted by a bolt through the plates 86 and 89 for horizontal pivotal movement relative to the transversely movable plate 86 about a vertical pivot axis 90 closely adjacent to and generally centered on the abrasive belt 17; and the portion 72 which is vertically pivotable relative to the pivot plate 86 about a horizontal axis parallel to the axis 26 of the wheel 28 that is defined by pivot pins 92 through the vertically pivotable portion 72 and the horizontal pivot plate 89 on the sides thereof adjacent the abrasive belt 17.

An adjustment assembly 100 manually operable by a wheel 101 is mounted on the vertically pivotable portion 72 of the frame means and includes a screw jack portion including a threaded axially movable rod 102 having a lower end bearing against horizontal pivot plate 89 (e.g., the screw jack commercially designated a "Jaculator" T.M. available from Minnesota Bearing, St. Paul, MN). Rotation of the wheel 101 changes the length of the portion of the rod 102 that extends between the vertically pivotable portion 72 and the horizontal pivot plate 89, thereby causing vertical pivotal movement of the vertically pivotable portion 72 relative to the horizontal pivot plate 89 about the pivot pins 92 and changing the engagement between the edge surface 14 of the wrench 12 and the abrasive belt 17 on the support surface 23 along the entire length of the wrench 12.

An adjustment screw assembly 105 is manually operable by a wheel 106 connected to a shaft rotatably mounted in a bearing block 108 mounted on the transversely movable plate 86 of the frame means, which shaft is coupled by a universal joint 109 to an extendible or retractable rod assembly 107 having an end attached to the horizontal pivot plate 89. Rotation of the wheel 106 provides means for changing the length of the rod assembly 102 (i.e., by screwing a threaded rod portion thereof into or out of an internally threaded socket portion thereof) thereby causing horizontal pivotal movement of the horizontal pivot plate 89 and the wheel 28 carried thereby about the vertical pivot axis 90 on the top surface of the transversely movable plate 86 to adjust the engagement of one end of the wrench 12 relative to the other with the abrasive belt 17 along the support surface 23.

An adjustment screw assembly 110 is manually operable by a wheel 111 connected to a shaft rotatably mounted in a bearing block 113 mounted on a plate fixed to the floor 82 on which the rail assemblies 83 are fixed, which shaft is coupled by a universal joint 114 to an extendible or retractable rod assembly 112 having an end attached to the transversely movable plate 86 of the frame means. Rotation of the wheel 111 provides means for changing the length of the rod assembly 112 (i.e., by screwing a threaded rod portion thereof into or out of an internally threaded socket portion thereof), thereby causing horizontal movement of the transversely movable plate 86 and the wheel 28 it supports through the pivotal portion 88 to adjust the area of contact between the wrench 12 and the abrasive belt 17 along the platen 22 in a direction parallel to the axis 26 of the wheel 28.

The present invention has now been described with reference to one embodiment thereof. It will be apparent to those skilled in the art that many changes can be made in the embodiment described without departing from the scope of the present invention. For example, when the grinding assembly is used to radius a straight edge portion on a bar or wrench, the abrasive belt used need not have a flexible backing. Instead of the platen 22, the abrasive belt 17 could be backed by a wheel having a specially shaped or cylindrical periphery, depending on the shape of the bar or wrench to be radiused. The unloading station 48 could be located at any position between the platen 22 and the loading station 33, or the operator could remove the finished tool at the loading station 33 before placing a wrench to be finished between the jaws 35 and 36. The actuating means for moving the jaws 35 and 36 between their release and engage positions could be provided by air or hydraulic operated mechanisms or by mechanical mechanisms other than the spring and cam mechanism illustrated. The radius of the Wheel 28 can be large (e.g., 30 inches) to form an edge surface with a large radius on the edge of a wrench or bar being finished, or can be made smaller (e.g. 10 inches) to form an edge surface with a smaller radius on the edge of a wrench or bar being finished. The portion 72 of the frame means on which the wheel 28 is journaled could be movably mounted on rails disposed at a right angle to the axis 26 of the wheel 28 between the pivot plate 86 and the portion 72 rather than being vertically pivotable relative to the pivot plate 86 about the pivot pins 92. The belt grinding mechanism 16 illustrated could be replaced by a contact wheel about which the abrasive belt is moved so that the contact wheel would provide the backup platen, and the belt grinding assembly thus modified could be used for grinding surfaces other than edge surfaces on bars, such as to grind the gates or other projections off of castings or other objects. Thus the scope of the present invention should not be limited to the structure described in this application, but only by structures described by the language of the claims and the equivalents of those structures.

We claim:

1. A belt grinding assembly for use on an elongate bar having opposite major side surfaces and an initial edge surface between the side surfaces that is rough and has a predetermined shape when viewed in the planes of the major surfaces, said belt grinding assembly being adapted to grind the bar to form a ground edge surface extending between the side surfaces that is smoothly arched while retaining the predetermined shape along the length of the bar, said belt grinding assembly comprising:
belt grinding mechanism comprising:
frame means;
a continuous abrasive belt having a backing with front and rear surfaces, and abrasive granules attached along said front surface;
means for driving said abrasive belt in a first direction along a path relative to said frame means;
a backup platen fixed to said frame means and having a support surface along said path adjacent the rear surface of said belt along said path, said support surface being straight in said first direction and having a uniform shape corresponding to the shape of the ground edge surface in a direction at a right angle to said first direction; and
a bar manipulating mechanism for moving the edge surface of the bar at a uniform rate of speed along an arcuate path about an axis at a right angle to said first direction into forceful engagement with the abrasive belt along said support surface to form the ground edge on the bar, said bar manipulating means comprising:
a wheel having a periphery;
means mounting said wheel on said frame for rotation about an axis at a right angle to said first direction to sequentially move the periphery of said wheel past a loading station relative to said frame, and then past said support surface;
drive means for rotating the periphery of said wheel past said support surface at a uniform rate of speed;
clamp means comprising spaced jaws mounted on the periphery of said wheel for relative movement between a release position with said jaws spaced to freely receive a bar between said jaws, and an engage position adapted to firmly clamp said bar between said jaws; and
jaw actuating means for moving said jaws from a release position at said loading station, and for positioning said jaws in said engage position during movement of said clamp assembly past said support surface.

2. A belt grinding assembly according to claim 1 wherein said periphery of said wheel has a predetermined diameter dimension, and said drive means for rotating the periphery of said wheel past said support surface at a uniform rate of rotation comprises a helical gear coaxial with said wheel and having a diameter dimension of within 25 centimeters (10 inches) of the diameter dimension of said wheel, a driving worm gear having an axis at a right angle to the axis of said helical gear, said driving worm gear being engaged with said helical gear to drive said helical gear, means for mounting the worm gear for radial movement relative to said helical gear, and means for biasing the teeth of said driving worm gear into engagement with the teeth of said helical gear to restrict backlash between said gears.

3. A belt grinding assembly for use on an elongate bar having opposite major side surfaces and an initial edge surface between the side surfaces that is rough and has a predetermined shape when viewed in the planes of the major surfaces, said belt grinding assembly being adapted to grind the bar to form a ground edge surface extending between the side surfaces that is smoothly arched while retaining the predetermined shape along the length of the bar, said belt grinding assembly comprising:
belt grinding mechanism comprising:
frame means;
a continuous abrasive belt having a backing with front and rear surfaces, and abrasive granules attached along said front surface;
means for driving said abrasive belt in a first direction along a path relative to said frame means;
a backup platen fixed to said frame means and having a support surface along said path adjacent the rear surface of said belt along said path, said support surface being straight in said first direction and having a uniform shape corresponding to the shape of said ground edge surface in a direction at a right angle to said first direction; and
a bar manipulating mechanism for moving the edge surface of the bar at a uniform rate of speed along an arcuate path about an axis at a right angle to said first direction into forceful engagement with the abrasive belt along said support surface to form said ground edge on said bar, said bar manipulating means comprising:
a wheel having a periphery;
means mounting said wheel on said frame for rotation about an axis at a right angle to said first direction to sequentially move the periphery of said wheel past a loading station relative to said frame, and then past said support surface;
drive means for rotating the periphery of said wheel past said support surface at a uniform rate of speed;
clamp means comprising spaced jaws mounted on the periphery of said wheel for relative movement between a release position with said jaws spaced to freely receive a bar between said jaws, and an engage position adapted to firmly clamp said bar between said jaws;
jaw actuating means for moving said jaws from a release position at said loading station, and for positioning said jaws in said engage position during movement of said clamp assembly past said support surface; and
wherein said jaws include a first jaw, means for releasably attaching said first jaw to the periphery of said wheel in a fixed position, a second jaw, and means for mounting said second jaw on said wheel for pivotal movement relative to said first jaw between said release and said engage positions; said jaw actuating means includes a spring between said jaws for biasing said second jaw toward said engage position, and cam means including a cam follower mounted on said second jaw and a cam mounted on said frame, said cam having a cam surface positioned for engagement by said cam follower to move said second jaw to said release position.

4. A belt grinding assembly according to claim 3 wherein said means for releasably attaching said first to the periphery of said wheel comprises structural means on said wheel for defining a slot extending generally parallel to the axis of said wheel and having an inlet opening at one end, said first jaw having a base for close fitting engagement in said slot, and means for releasably retaining said base in said slot.

5. A belt grinding assembly according to claim 4 wherein said wheel has a cylindrical peripheral surface, said slot is defined by a part of said peripheral surface and at least one side surface disposed at an acute angle relative to the periphery of said wheel, and said means for releasably retaining includes means for forcefully pressing said base against said side surface.

6. A belt grinding assembly according to claim 1 wherein said clamp means comprises a plurality of pairs of spaced jaws, said pairs being mounted on the periphery of said wheel in spaced relationship, each of said pairs being mounted on said wheel for relative movement between said release position with said jaws spaced to freely receive a bar between said jaws, and said engage position adapted to firmly clamp said bar between said jaws; said jaw actuating means moves each of said pairs of jaws to said release position at said loading station, positions said jaws in said engage position as said clamp assembly moves past said support surface, and moves each of said pairs of jaws to said release position at an unloading position fixed relative to said frame along the lowermost portion of said wheel, and past which unloading position said pairs of jaws are moved after movement from said loading position past said support surface.

7. A belt grinding assembly for use on an elongate bar having opposite major side surfaces and an initial edge surface between the side surfaces that is rough and has a predetermined shape when viewed in the planes of the major surfaces, said belt grinding assembly being adapted to grind the bar to form a ground edge surface extending between the side surfaces that is smoothly arched while retaining the predetermined shape along the length of the bar, said belt grinding assembly comprising:

belt grinding mechanism comprising:
frame means;
a continuous abrasive belt having a backing with front and rear surfaces, and abrasive granules attached along said front surface;
means for driving said abrasive belt in a first direction along a path relative to said frame means;
a backup platen fixed to said frame means and having a support surface along said path adjacent the rear surface of said belt along said path, said support surface being straight in said first direction and having a uniform shape corresponding to the shape of said ground edge surface in a direction at a right angle to said first direction; and
a bar manipulating mechanism for moving the edge surface of the bar at a uniform rate of speed along an arcuate path about an axis at a right angle to said first direction into forceful engagement with the abrasive belt along said support surface to form said ground edge on said bar, said bar manipulating means comprising:
a wheel having a periphery;
means for mounting said wheel on said frame for rotation about an axis at a right angle to said first direction to sequentially move the periphery of said wheel past a loading station relative to said frame, and then past said support surface;
drive means for rotating the periphery of said wheel past said support surface at a uniform rate of speed;
clamp means comprising spaced jaws mounted on the periphery of said wheel for relative movement between a release position with said jaws spaced to freely receive a bar between said jaws, and an engage position adapted to firmly clamp said bar between said jaws;

jaw actuating means for moving said jaws from a release position at said loading station, and for positioning said jaws in said engage position during movement of said clamp assembly past said support surface;
wherein said periphery of said wheel has a predetermined diameter dimension, and said drive means for rotating the periphery of said wheel past said support surface at a uniform rate of rotation comprises a helical gear coaxial with said wheel and having a diameter dimension of within 25 centimeters (10 inches) of the diameter dimension of said wheel, a driving worm gear having an axis at a right angle to the axis of said helical gear, said driving worm gear being engaged with said helical gear to drive said helical gear, means for mounting the worm gear for radial movement relative to said helical gear, and means for biasing the teeth of said driving worm gear into engagement with the teeth of said helical gear to restrict backlash between said gears; and
wherein said means for mounting the worm gear for radial movement relative to said helical gear comprises a frame portion on which said worm gear is rotatably mounted having a plurality of pins projecting at a right angle to the axis of said worm gear, and a frame portion on which said helical gear is mounted having sockets receiving said pins and affording axial movement of said rods in said sockets, and said means for biasing the teeth of said driving worm gear into engagement with the teeth of said helical gear to restrict backlash between said gears comprises helical coil springs around said pins between said frame portions.

8. A belt grinding assembly adapted for use to form a new surface on an object said grinding assembly comprising:

a belt grinding mechanism comprising:
frame means;
a continuous abrasive belt having a backing with front and rear surfaces, and abrasive granules attached along said front surface;
means for driving said abrasive belt in a first direction along a path relative to said frame means;
backup means having a support surface for said belt along said path; and
an object manipulating mechanism for moving the surface of the object at a uniform rate of speed along an arcuate path about an axis at a right angle to said first direction into forceful engagement with the abrasive belt along said support surface, said object manipulating means comprising:
a wheel having a periphery;
means mounting said wheel on said frame for rotation about an axis at a right angle to said first direction to sequentially move the periphery of said wheel past a loading station relative to said frame, and then past said support surface;
drive means for rotating the periphery of said wheel past said support surface at a uniform rate of speed;
clamp means comprising spaced jaws mounted on the periphery of said wheel for relative movement between a release position with said jaws spaced to freely receive an object between said jaws, and an engage position adapted to firmly clamp said object between said jaws; and
jaw actuating means for moving said jaws from a release position at said loading station, and for positioning said jaws in said engage position during movement of said clamp assembly past said support surface.

9. A belt grinding assembly according to claim 8 wherein said periphery of said wheel has a predetermined diameter dimension, and said drive means for rotating the periphery of said wheel past said support surface at a uniform rate of rotation comprises a helical gear coaxial with said wheel and having a diameter dimension of within 25 centimeters (10 inches) of the diameter dimension of said wheel, a driving worm gear having an axis at a right angle to the axis of said helical gear, said worm gear being engaged with said helical gear to drive said helical gear, means for mounting the worm gear for radial movement relative to said helical gear, and means for biasing the teeth of said driving worm gear into engagement with the teeth of said helical gear to restrict backlash between said gears.

10. A belt grinding assembly for sue to form a new surface on an object said grinding assembly comprising:
a belt grinding mechanism comprising:
frame means;
a continuous abrasive belt having a backing with front and rear surfaces, and abrasive granules attached along said front surface;
means for driving said abrasive belt in a first direction along a path relative to said frame means;
backup means having a support surface for said belt along said path; and
an object manipulating mechanism for moving the surface of the object at a uniform rate of speed along an arcuate path about an axis at a right angle to said first direction into forceful engagement with the abrasive belt along said support surface, said object manipulating means comprising:
a wheel having a periphery;
means mounting said wheel on said frame for rotation about an axis at a right angle to said first direction to sequentially move the periphery of said wheel past a loading station relative to said frame, and then past said support surface;
drive means for rotating the periphery of said wheel past said support surface at a uniform rate of speed;
clamp means comprising spaced jaws mounted on the periphery of said wheel for relative movement between a release position with said jaws spaced to freely receive an object between said jaws, and an engage position adapted to firmly clamp said object between said jaws;
jaw actuating means for moving said jaws from a release position at said loading station, and for positioning said jaws in said engage position during movement of said clamp assembly past said support surface;
wherein said jaws include a first jaw, means for releasably attaching said first jaw to the periphery of said wheel in a fixed position, a second jaw, and means for mounting said second jaw on said wheel for pivotal movement relative to said first jaw between said release and said engage positions; said jaw actuating means includes a spring between said jaws for biasing said second jaw toward said engage position, and cam means including a cam follower mounted on said second jaw and a cam mounted on said frame, said cam having a cam surface positioned for engagement by said cam follower to move said second jaw to said release position.

11. A belt grinding assembly according to claim 10 wherein said means for releasably attaching said first jaw to the periphery of said wheel comprises structural means on said wheel for defining a slot extending generally parallel to the axis of said wheel and having an inlet opening at one end, said first jaw having a base for close fitting engagement in said slot, and means for releasably retaining said base in said slot.

12. A belt grinding assembly according to claim 11 wherein said wheel has a cylindrical peripheral surface, said slot is defined by a part of said peripheral surface and at least one side surface disposed at an acute angle relative to the periphery of said wheel, and said means for releasably retaining includes means for forcefully pressing said base against said side surface.

13. A belt grinding assembly according to claim 8 wherein said clamp means comprises a plurality of pairs of spaced jaws, said pairs being mounted on the periphery of said wheel in spaced relationship, each of said pairs being mounted on said wheel for relative movement between said release position with said jaws spaced to freely receive a bar between said jaws, and said engage position adapted to firmly clamp said bar between said jaws; said jaw actuating means moves each of said pairs of jaws to said release position at said loading station, positions said jaws in said engage position as said clamp assembly moves past said support surface, and moves each of said pairs of jaws to said release position at an unloading position fixed relative to said frame along the lowermost portion of said wheel, and past which unloading position said pairs of jaws are moved after movement from said loading position past said support surface.

14. A belt grinding assembly for use to form a new surface on an object said grinding assembly comprising:
a belt grinding mechanism comprising:
frame means;
a continuous abrasive belt having a backing with front and rear surfaces, and abrasive granules attached along said front surface;
means for driving said abrasive belt in a first direction along a path relative to said frame means;
backup means having a support surface for said belt along said path; and
an object manipulating mechanism for moving the surface of the object at a uniform rate of speed along an arcuate path about an axis at a right angle to said first direction into forceful engagement with the abrasive belt along said support surface, said object manipulating means comprising:
a wheel having a periphery;
means mounting said wheel on said frame for rotation about an axis at a right angle to said first direction to sequentially move the periphery of said wheel past a loading station relative to said frame, and then past said support surface;
drive means for rotating the periphery of said wheel past said support surface at a uniform rate of speed;
clamp means comprising spaced jaws mounted on the periphery of said wheel for relative movement between a release position with said jaws spaced to freely receive an object between said jaws, and an engage position adapted to firmly clamp said object between said jaws;

jaw actuating means for moving said jaws from a release position at said loading station, and for positioning said jaws in said engage position during movement of said clamp assembly past said support surface;

wherein said periphery of said wheel has a predetermined diameter dimension, and said drive means for rotating the periphery of said wheel past said support surface at a uniform rate of rotation comprises a helical gear coaxial with said wheel and having a diameter dimension of within 25 centimeters (10 inches) of the diameter dimension of said wheel, a driving worm gear having an axis at a right angle to the axis of said helical gear, said worm gear being engaged with said helical gear to drive said helical gear, means for mounting the worm gear for radial movement relative to said helical gear, and means for biasing the teeth of said driving worm gear into engagement with the teeth of said helical gear to restrict backlash between said gears; and wherein said means for mounting the worm gear for radial movement relative to said helical gear comprises a frame portion on which said worm gear is rotatably mounted having a plurality of pins projecting at a right angle to the axis of said worm gear, and a frame portion on which said helical gear is mounted having sockets receiving said pins and affording movement of said pins in said sockets, and said means for biasing the teeth of said driving worm gear into engagement with the teeth of said helical gear to restrict backlash between said gears comprises helical coil springs around said pins between said frame portions.

* * * * *

UNITED STATES PATENT AND TRADEMARK OFFICE
CERTIFICATE OF CORRECTION

PATENT NO. : 5,140,775
DATED : August 25, 1992
INVENTOR(S) : Arthur P. Luedeke, Bradley W. Keller and Clarence I. Steinback It is certified that error appears in the above-indentified patent and that said Letters Patent is hereby corrected as shown below:

Col. 10, line 59, after "first" insert --jaw--.
Col. 12, line 35, after "assembly" delete --adapted--.

Signed and Sealed this

Twenty-sixth Day of April, 1994

Attest:

BRUCE LEHMAN

Attesting Officer    Commissioner of Patents and Trademarks